United States Patent [19]

Rajput et al.

[11] 4,098,542

[45] Jul. 4, 1978

[54] INDICATOR ENERGIZING MONITOR CIRCUIT FOR ANTI-SKID BRAKE CONTROL SYSTEMS AND THE LIKE

[75] Inventors: Yudh Vir Rajput, Dayton, Ohio; Kirby Dean Fickle, Columbia, S.C.

[73] Assignee: The B. F. Goodrich Company, Akron, Ohio

[21] Appl. No.: 777,991

[22] Filed: Mar. 16, 1977

[51] Int. Cl.² .............................................. B60T 8/00
[52] U.S. Cl. ................................. 303/92; 340/52 R; 340/56
[58] Field of Search ............. 303/92; 340/248 R, 214, 340/411, 52 R, 52 F, 56; 361/196

[56] References Cited

U.S. PATENT DOCUMENTS

| 3,668,627 | 6/1972 | Brainerd | 340/248 R |
| 3,702,206 | 11/1972 | Sweet | 303/92 |
| 3,920,284 | 11/1975 | Lane | 303/92 |

Primary Examiner—Trygve M. Blix
Assistant Examiner—Reinhard J. Eisenzopf
Attorney, Agent, or Firm—Harry F. Pepper, Jr.

[57] ABSTRACT

A monitor circuit coupled to an anti-skid brake control system or the like has as one function the energization of a warning lamp each time the system is powered-up and as a second function the energization of that lamp when a fault is detected in the system. The invention relates to improvements in such a monitor circuit, including a delay mechanism to preclude inadvertent energization of the warning lamp in response to electrical noise signals, for example, that are common in a vehicle, and a protective mechanism to prevent destruction of parts of the monitor circuit if the output terminals thereof coupled to the warning lamp are short circuited.

15 Claims, 1 Drawing Figure

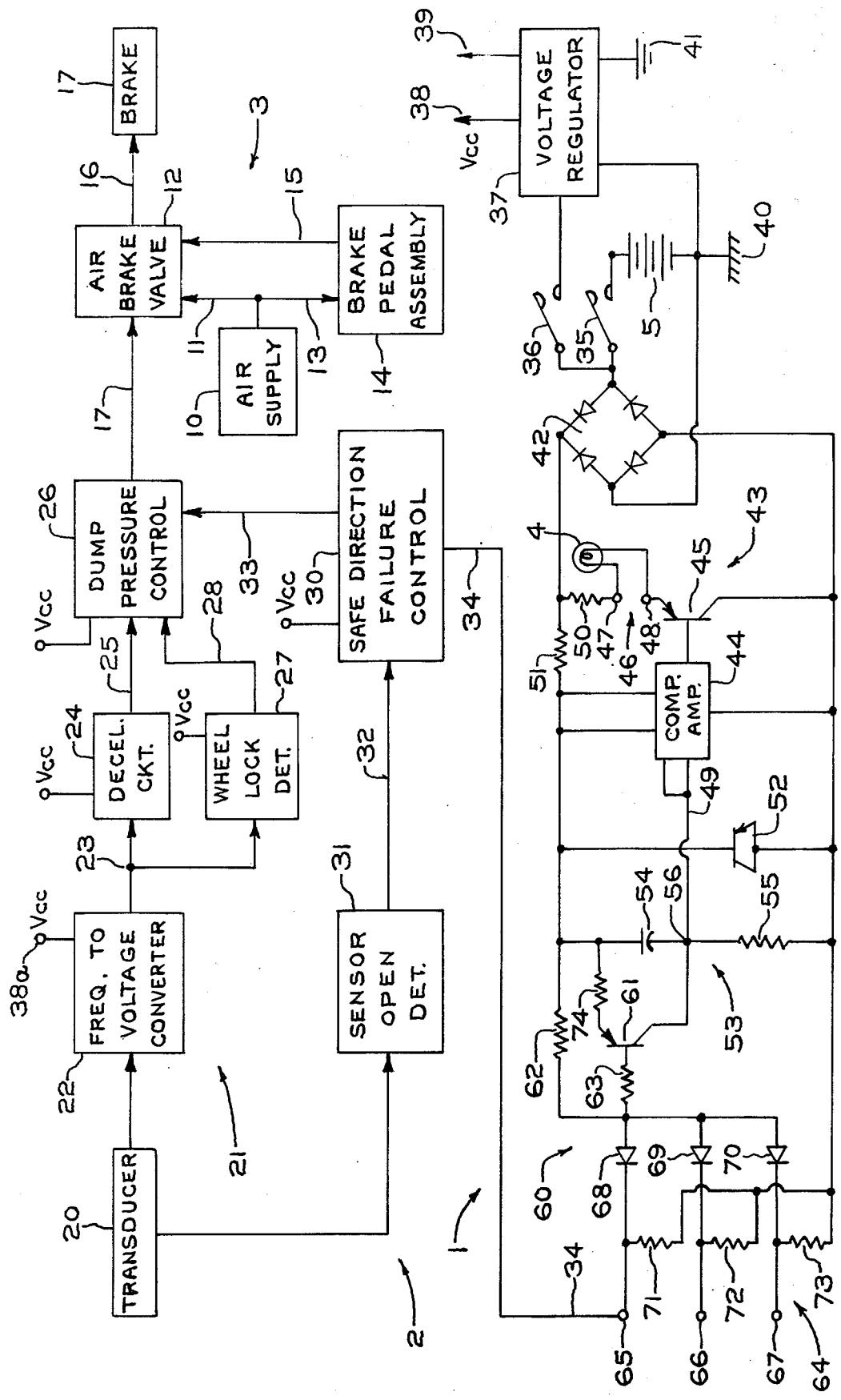

INDICATOR ENERGIZING MONITOR CIRCUIT FOR ANTI-SKID BRAKE CONTROL SYSTEMS AND THE LIKE

BACKGROUND OF THE INVENTION

The present invention relates to a monitor circuit for use in anti-skid brake control systems and the like and, more particularly, to such a monitor circuit that energizes an indicator when powered-up or when a fault has been detected in the system. Moreover, the invention is directed to such a monitor circuit that has relatively improved reliability.

Anti-skid brake control systems with which the monitor circuit of the present invention may be used are disclosed, for example, in U.S. Pat. No. 3,917,359 and in copending U.S. Patent Applications Ser. No. 685,267, filed May 11, 1976, for "Anti-Skid Brake Control System with Short Circuit Protection" now U.S. Pat. No. 4,040,676, issued Aug. 9, 1977; Ser. No. 769,255, filed Feb. 16, 1977, for "Anti-Skid Brake Control System with Power-Up Delay"; Ser. No. 770,535 filed Feb. 22, 1977, for "Anti-Skid Brake Control System with Circuit For Monitoring Slower Wheel"; and Ser. No. 779,205, filed Mar. 18, 1977, for "Capacitive Shunt to Minimize Noise Effects in an Anti-Skid Brake Control System". These copending applications are assigned to the same assignee as the present application.

The principal purpose of an anti-skid brake control system is to provide automatic overriding control of the brakes of a vehicle when an incipient or actual skid (hereinafter skid), a locked wheel, or a like condition exists. Upon detecting such a condition, the system dumps, for example, to the ambient environment, part or all (hereinafter a percentage) of the brake operating fluid pressure (hereinafter air pressure) which the vehicle operator then may be attempting to apply manually by pressing on the vehicle brake pedal with his foot. By dumping a percentage of the air pressure the skidding wheels, for example, are permitted to re-gain traction with the road surface. After the skid, locked wheel, or like condition has terminated, the system stops the air pressure dump allowing all of the air pressure requested by the driver to be delivered to the respective air brakes.

In such a system a transducer produces an AC transducer signal that has a frequency indicative of the speed of the vehicle wheel being monitored. A controller is operative in response to the AC transducer signal to produce a dump signal that energizes one or more solenoids in a modulator air brake valve to dump a percentage of the air pressure requested by the driver when the condition or change of the AC transducer signal indicates a skid or locked condition of the wheel. A safe direction failure control circuit monitors various portions of the system and is operative to shut down the system upon detecting a fault. Moreover, a monitor circuit coupled to the safe direction failure control circuit watches the output of the latter and is operative in response to detection of a fault thereby to energize an indicator lamp warning the driver that a fault has been detected in the system and, usually, that the system has been shut down or made inoperative so that full manual control of the vehicle brakes has been restored.

In a vehicle that has a plurality of axles, such as a truck, there may be a separate anti-skid brake control system associated with each respective axle. For example, in a vehicle with two axles respective transducers would be coupled to each of the forward wheels and would deliver AC transducer signals to a common controller which is operative to dump a percentage of the air pressure requested by the driver to be delivered to the brakes of the forward wheels if either of those wheels skids or locks. Respective transducers and a further common controller would be similarly associated with the rear wheels and air brake valves thereof.

A common monitor circuit may be coupled to the respective safe direction failure control circuits of all the controllers or to a common safe direction failure control circuit for plural controllers to provide at least two useful functions. The first or checking function of the monitor circuit is to energize a warning lamp, for example, positioned on the dashboard, each time the system or systems and/or the monitor circuit itself are powered up, i.e. electrical power is supplied thereto, to indicate to the driver that the lamp and the other parts of the system or systems are operable; and the second or warning function is to watch the indicator output signals from the safe direction failure control circuit or circuits to energize the warning lamp whenever a fault is detected to indicate the same to the driver. The latter type energization of the warning lamp may be employed to indicate that manual control of the vehicle brake system or at least one portion thereof, e.g. the one associated with the wheels on one axle, has been returned to the driver.

Intermittent energization of the warning light by the monitor circuit has been found to occur on some vehicles which have the other parts of the anti-skid brake control system functioning properly. It has been determined that transient electrical signals (transients), which commonly occur in most vehicles, particularly in electronic systems thereof, have been the cause of such intermittent energization that provides undesirably false information to the driver. Moreover, since the warning lamp coupled to the indicator output terminals of the monitor circuit must be easily removed for replacement purposes, there is a possibility that a short circuit may occur thereat when the warning lamp is removed and/or replaced; and it has been found in the past that a power surge upon short circuiting may cause damage to one or more of the electrical components of the monitor circuit.

SUMMARY OF THE INVENTION

By the present invention the reliability of a monitor circuit for anti-skid brake control systems or the like is improved by immunizing the same from the influence of transients and short circuits across the indicator output terminals.

In one embodiment the checking function is achieved, as in the past, by a resistor and capacitor timing circuit coupled in the monitor circuit to effect energization of the warning lamp from the time the monitor circuit is sufficiently energized until the capacitor in the timing circuit has charged to a predetermined level, and the warning function is effected by discharging the capacitor. However, in accordance with the present invention the rate at which such discharging is effected is sufficiently reduced so that relatively short-lived transients will not cause sufficient discharging to effect energization of the warning lamp to provide its warning function. In a preferred embodiment the delay mechanism is a resistor of sufficient size to preclude energization of the warning lamp when expected transients occur but, on the other hand, sufficiently small to assure relatively prompt discharge of the capacitor to turn on the warning lamp after a fault has been detected. Additionally, a current limiting impedance is provided in series with the indicator output terminals to reduce the power surge, either current or voltage, if such terminals become short circuited preferably without appreciably affecting the intensity of the illumination produced by the warning lamp. That impedance may be a current limiting resistor, and in an alternate embodiment may be a self-heating resistor that increases its resistance with respect to increased temperature with this latter form being preferred when short circuits of relatively long duration are expected.

With the foregoing in mind it is a primary object of the invention to provide a monitor circuit of the type described that is improved in the noted respects.

Another object is to improve the reliability of a monitor circuit and particularly such a monitor circuit used in connection with an anti-skid brake control system or the like.

An additional object is to reduce and/or to eliminate damage to circuit components in a monitor circuit in the event of a short circuit at the output terminals thereof.

A further object is to reduce and/or to eliminate false operation of a monitor circuit due to electrical noise transients or the like.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

The sole FIGURE is a schematic electric circuit diagram, partly in block form, illustrating a monitor circuit in accordance with the invention coupled in an anti-skid brake control system of a vehicle.

DESCRIPTION OF THE PREFERRED EMBODIMENT

Referring now more particularly to the drawing, a monitor circuit in accordance with the invention is generally indicated at 1 coupled in an anti-skid brake control system 2, which ordinarily is operative upon sensing a skid, locked wheel, or the like to effect overriding control of the air brake system 3 of a vehicle. As will be described further below, the monitor circuit 1 is operative to energize a warning lamp 4 whenever electrical power is initially supplied to the monitor circuit and to the remainder of the anti-skid brake control system 2, for example, by the vehicle battery 5 or other source of electrical power. The monitor circuit 1 also is operative to energize the warning lamp 4 when a fault has been detected in the anti-skid brake control system 2.

In describing the monitor circuit 1 in accordance with the invention as used in connection with an anti-skid brake control system 2, it will be assumed, for example, that the system is coupled for overriding manual control of the conventional air brake system 3 of a truck vehicle, although it will be appreciated that the monitor circuit 1 and the system 2 may be similarly employed in other vehicles.

In the air brake system 3 a primary supply of air pressure is provided from the vehicle air supply 10 via a fluid connection 11 to a conventional air brake valve 12 and via a fluid connection 13 to the brake pedal assembly 14. The driver may manually operate the brake pedal by his foot, for example, to determine the amount of control air pressure supplied via fluid line 15 to the air brake valve 12 to open the latter a corresponding amount, thereby to provide a controlled amount of brake operating primary air pressure delivered via the fluid line 16 to the vehicle air brakes 17 to operate the same to slow the vehicle in conventional manner.

The air brake valve 12 includes a modulator valve portion, not shown, that may be solenoid operated in conventional manner to dump a percentage of the air pressure being called for by the driver in response to a dump signal delivered on the electrical output 17 of the system 2. The dump signal energizes one or more solenoids in the air brake valve 12, for example depending on the magnitude of the dump signal, to dump a percentage of the air pressure, thereby allowing the skidding or locked wheels to regain traction with the road. Various types of modulator valve portions for air brake valves are found in the prior art patent literature, for example, and one particular type of valve with which the system 2 may be used is specifically disclosed in a brochure entitled "Triple Action Skid Control", published by B. F. Goodrich Co., March, 1975.

The anti-skid brake control system 2 may include a conventional transducer 20 mounted in one of the wheel assemblies of the vehicle, not shown, to produce an AC transducer signal having a frequency indicative of the wheel speed. The transducer 20 may include a permanent magnet mounted to rotate with the wheel being monitored and a coil fixedly mounted relative to the rotatable magnet and in which the AC transducer signal is induced in response to such rotation.

The system 2 also includes a controller 21, which is operative in response to the frequency of the AC transducer signal and/or changes in the same to produce the dump signal on line 17 when a skid, locked wheel, or the like is detected. In the controller 21 a frequency to voltage converter 22, which may be a conventional device including squaring and integrating circuits, for example, converts the AC transducer signal to a DC voltage on line 23 with the amplitude of such DC voltage being representative of the frequency of the AC transducer signal and, thus, of the wheel speed. A deceleration detector 24, which may be a conventional differentiating circuit, monitors downward changes in the DC voltage on line 23 as an indication of wheel deceleration and produces a deceleration signal on line 25 indicative of the wheel deceleration. If the rate of downward change of the DC voltage on line 23, as reflected by the magnitude of the deceleration signal on line 25, exceeds a predetermined excessive level, a dump pressure control circuit 26, which may be a comparator amplifier or the like, responds to the same to produce the dump signal, for example at a magnitude or of a character representative of the magnitude of the deceleration, on the system output 17 to dump a percentage of the air pressure. The production of such an excessive deceleration signal ordinarily would be indicative of an incipient or actual skid, therefore, by dumping a percentage of the air pressure requested by the driver to slow the vehicle, which has begun to skid, the skidding wheel is permitted to spin up at least slightly to regain at least some of its traction with the road surface.

The DC voltage on line 23 also is monitored by a wheel lock detector 27, which responds, for example, to a substantially instantaneous drop of the DC voltage by more than a predetermined amount as an indication that the wheel is going into a locked condition. Such detection ordinarily would occur after excessive deceleration had been detected. Moreover, upon detecting such locked wheel condition, the wheel lock detector 27 produces a wheel locked signal on line 28 to energize the dump pressure control 26 to produce a dump signal, which, as above, tends to alleviate the locked wheel condition.

A safe direction failure control circuit 30 monitors the transducer 20 via a sensor open detector 31 and may similarly monitor the operability of other parts of the system 2. The sensor open detector 31 may be a transistor switching circuit that monitors the completeness of the electrical circuit in which the coil, for example, of the transducer 20 is connected. If the sensor open detector 31 detects an open circuit at the transducer, a signal indicating the same is produced on line 32 for delivery to the safe direction failure control 30. Accordingly, such open circuit fault at the transducer 20 detected by the sensor open detector 31 will trigger the safe direction failure control 30 to disable the dump pressure control 26, for example by cutting off power supplied to the latter via line 33, so that the system cannot override manual operation of the air brake system 3. Moreover, the safe direction failure control 30 preferably is a self-latching type circuit that maintains the dump pressure control 26 disabled until the fault detected in the system 2 has been corrected and the system has been deenergized and subsequently re-energized.

The safe direction failure control 30 also is connected by line 34 to the monitor circuit 1 for operating the same to energize the warning lamp 4 whenever a fault has been detected in the system 2 and the system has been disabled or shut down.

The foregoing description of the transducer 20, controller 21, and air brake system 3 is provided to exemplify one type of anti-skid brake control system arrangement with which the monitor circuit 1 in accordance with the invention may be employed, and more detailed descriptions of these components are presented in the above-mentioned patent and copending applications, which to the extent they may be considered necessary to complete the present disclosure are hereby incorporated by reference. Moreover, although the controller 21 is illustrated and described as being operative to produce a dump signal in response to an AC transducer signal from a single transducer 20 that monitors one vehicle wheel, it will be appreciated that plural transducers may be employed to monitor plural respective wheels producing respective AC transducer signals indicative of the respective wheel speeds, and the controller 21 may be appropriately modified in accordance with the above-referenced disclosures to respond to the respective AC transducer signals. In a preferred anti-skid brake control system a pair of transducers are employed to monitor the rotational speed of a pair of wheels on the opposite sides of a common axle of the vehicle, as is described, for example, in the copending application entitled "Anti-Skid Brake Control System with Circuit for Monitoring Slower Wheel"; however, it will be appreciated that the transducers and/or controller may be employed to monitor the adjacent tandem wheels of a vehicle, for example, as in U.S. Pat. No. 3,847,446. As desired, the controller 21 may be responsive to only a single transducer 20 to dump air pressure from a single air brake valve 12, may be responsive to several transducers 20 to produce a dump signal to operate several air brake valves 12, may be responsive to all of the transducers 20 of the vehicle to produce a dump signal to operate all of the air brake valves 12 associated with the vehicle, etc.

Electrical power is provided to the various portions of the anti-skid brake control system 2 from the vehicle battery 5 via a pair of switches 35, 36, which may be operated jointly or independently, and a voltage regulator 37, for example, that delivers regulated $V_{cc}$ voltage from an output terminal 38 to correspondingly labeled input terminals of the several controller parts, such as terminal 38a, and an unregulated power signal at terminal 39, which may be controllably delivered by the safe direction failure control 30 on line 33 to the dump pressure control 26, as described above, and from the latter as the dump signal on line 17 to operate the solenoids in the air brake valve 12. The negative side of the battery 5 is coupled to the chassis of the vehicle to provide a chassis ground reference potential 40 for the monitor circuit 1 and the other portions of the anti-skid brake control system 2 including the voltage regulator 37, and the voltage regulator 37 also includes a connection 41 as a relative circuit ground reference potential that may be the same or different from the chassis ground 40, as desired. The electrical power supplied to the monitor circuit 1, as indicated, from the vehicle battery 5 and switch 35, which may be closed in response to closure of the vehicle ignition switch also passes a conventional bridge rectifier 42 for polarity correction purposes.

In the monitor circuit 1 an output circuit 43 includes a comparator amplifier 44, such as an integrated circuit No. NE555V with several connections thereto as exemplified in the drawing, a transistor switch 45, and an indicator output 46 having a pair of terminals 47, 48 across which the warning lamp 4 or other indicator is connected. Ordinarily the comparator amplifier 44 maintains the transistor switch 45 nonconductive so that the warning lamp 4 remains de-energized; however, the output circuit 43 is operative in response to a voltage of at least a predetermined amplitude being provided to the input 49 of the comparator amplifier 44 causing the latter to bias the transistor 45 to conduction thereby completing a circuit to energize the warning lamp 4.

In accordance with one aspect of the invention a resistor 50 is connected in series circuit with respect to the indicator output 46 and the transistor 45. It is the purpose of the resistor 50 to limit the size of the power surge that may occur if the terminals 47, 48 were short circuited, for example during removal and/or replacement of the warning lamp 4 in its socket on the vehicle dashboard. The size of the resistor 50 should be sufficiently small to avoid appreciable reduction in the intensity of the light output from the warning lamp 4 and at the same time should be sufficiently large to limit the instantaneous voltage and/or current to the transistor 45 and/or drawn from the bridge rectifier 42 upon occurrence of such short circuit to avoid damage to those elements. The shorter the duration of any expected short circuit, the smaller may be the resistor 50. The size of the resistor 50 may be, for example, 10 ohms when the battery voltage is on the order from about 12 to about 18 volts and the transistor 45 may be an A5T4028. However, if desired, the resistor 50 may be a self-heating type resistor that increases its resistance with increasing temperature to limit the voltage and/or current from the bridge rectifier 42 and to the transistor 45 satisfactorily if a lengthy short circuit occurred at the indicator output 46; of course, the operative current and/or voltage parameters of such a self-heating resistor preferably would be selected to avoid self-heating when the warning lamp 4 is properly connected across the indicator output 46.

To limit and/or to provide some degree of regulation in the voltage applied across the comparator amplifier 44, a resistor 51 isolates the same from the bridge rectifier 42, and a transistor 52, which is coupled in the manner illustrated to provide a voltage regulating function similar to that of a conventional zener diode, is connected across the comparator amplifier.

The monitor circuit 1 also includes a timer circuit 53, having a series connected capacitor 54 and resistor 55 coupled across the transistor 52, as shown, with the node juncture 56 between the capacitor and resistor also being coupled to the input line 49 of the comparator amplifier 44. It is the purpose of the timer circuit 53 to operate the output circuit 43 for a predetermined duration each time the switch 35 is closed to power up the monitor circuit 1, whereupon the warning lamp 4 is energized to indicate its operability to the driver. Accordingly, when the switch 35 is closed, voltage is supplied to the timer circuit 53, whereupon the capacitor 54 charges at a rate determined by the RC time constant of the circuit in which it is connected. Initially the voltage at the juncture 56 is approximately equal to that provided to the monitor circuit 1 by the bridge rectifier 42 less the voltage drop across the resistor 51, with the amplitude of such nodal voltage being sufficient to operate the output circuit 43 to energize the warning lamp 4. Moreover, the output circuit 43 will continue to energize the warning lamp 4 as the capacitor 54 charges until the amplitude of the nodal voltage drops below the predetermined level necessary to operate the comparator amplifier 44, whereupon the transistor 45 is cut off to de-energize the warning lamp 4.

An input circuit 60 coupled to the line 34, for example, includes a transistor switch mechanism 61 for effectively bypassing the timer circuit 53 by discharging the capacitor 54 to raise the amplitude of the voltage at the node 56 to a sufficient level to operate the output circuit 43 to energize the warning lamp 4 when the safe direction failure control 30 detects a fault in the system 2 and produces a fault signal on line 34. Such energization of the warning lamp 4 accordingly indicates to the driver that a fault has been detected in the system 2 and usually a part or all of such system has been disabled.

The input circuit 60 also includes a pair of resistors 62, 63, which ordinarily provide a bias voltage to the transistor 61 to maintain the same cut off. Moreover, the input circuit includes a NAND gate 64, as shown with three individual input terminals 65, 66, 67 that are connected to respective lines 34 from respective safe direction failure control circuits 30 of respective controllers 21, only one of which is illustrated. The three portions of NAND gate 64 include respective diodes 68, 69, 70 and respective resistors 71, 72, 73.

In operation of the monitor circuit 1 after the capacitor 54 of the timer circuit 53 has sufficiently charged so that the warning lamp 4 is de-energized, assuming that the system 2 is properly operating, a high or relatively positive voltage signal will be produced by the safe direction failure control 30 on the line 34 to reverse bias the diode 68 in the NAND gate 64, thereby assuring that a sufficiently positive voltage is applied to the base of the transistor 61 to bias the same in its cut off condition. However, when a fault is detected by the safe direction failure control 30, it produces a relatively low voltage fault signal, such as zero volts, on line 34, whereupon the diode 68 in the NAND gate 64 becomes forward biased and the transistor 61 becomes conductive effectively to bypass the timer circuit 53 by discharging the capacitor 54, thereby raising the amplitude of the nodal voltage at the node 56 whereupon the output circuit 43 energizes the warning lamp 4. The input terminal 66, 67 may be coupled as the terminal 65 to respective safe direction failure control circuits of other controllers, for example, in the overall anti-skid brake control system arrangement of the vehicle to enable energization of the warning lamp 4 when other fault signals are received at such terminals.

In the past the transistor 61 has been coupled directly across the capacitor 54 to assure prompt energization of the warning lamp 4 when a fault signal was received on line 34 from the safe direction failure control 30. However, transients on the line 34, for example, or elsewhere in the monitor circuit 1 had been found to trigger the transistor 61 causing immediate discharge of the capacitor 54 and turn on of the warning lamp 4 with the latter remaining energized after the termination of the transient and cut off of the transistor 61 until the timer circuit 53 had reset itself by a re-charging of the capacitor 54 to reduce the amplitude of the nodal voltage below the level sufficient to operate the output circuit 43.

Therefore, in accordance with another aspect of the invention an impedance preferably in the form of a resistor 74 has been added in series circuit with the emitter collector discharge path of the transistor 61 to slow the rate at which the capacitor 54 discharges, i.e. to increase the discharge time, when the transistor 61 is turned on. The size of the resistor 74 should be sufficiently large to prevent raising of the amplitude of the nodal voltage to a level sufficient to operate the output circuit 43 to turn on the warning lamp 4 in response to ordinarily expected transients, but the resistor should be sufficiently small to assure that the warning lamp 4 will be energized within a relatively short time after the detection of a fault by the safe direction failure control 30. In an exemplary monitor circuit 1 the values for the capacitor 54, resistor 55, and resistor 74 were 15 uf., 330K ohms, and 5.1K ohms, respectively. These values were found satisfactory to assure that the test function of the monitor circuit 1 would be operative to provide a reasonably lengthy energization of the warning lamp 4 upon power-up and to avoid turn on of the warning lamp in response to the ordinarily expected transients.

The embodiments of the invention in which an exclusive property or privilege is claimed are defined as follows:

1. A monitor circuit for monitoring detection of a fault condition or the like to control energization of an indicator, comprising
power supply means for supplying electric power to the monitor circuit,
output circuit means for controlling energization of the indicator,
timer circuit means for operating said output circuit means each time said power supply means powers up the monitor circuit to energize the indicator for a predetermined duration and thereafter while said power supply means continues to supply electric power to the monitor circuit to maintain the indicator de-energized, input circuit means for bypassing said timer circuit means upon receipt of an input signal indicative of detection of a fault condition or the like to operate said output circuit means for energization of the indicator to indicate such detection, and said timer circuit means including delay means for delaying completion of such bypassing of said timer circuit means to preclude inadvertent energization of the indicator in response to electrical noise signals received by said input circuit means.

2. The circuit of claim 1, wherein said timer circuit means comprises a series connected resistor and capacitor circuit.

3. The circuit of claim 2, wherein said input circuit means comprises a discharge circuit coupled in parallel with said capacitor to discharge the same.

4. The circuit of claim 3, wherein said delay means comprises resistor means coupled in said discharge circuit for delaying such discharging of said capacitor.

5. The circuit of claim 1, further comprising in combination therewith an anti-skid brake control system for a vehicle including transducer means for producing AC transducer signals indicative of the speed of at least one wheel of such vehicle, controller means responsive to such AC transducer signal for producing a dump signal upon detecting an incipient or actual skid, locked wheel or like condition, fault detector means for detecting a fault in the anti-skid brake control system, and means for coupling said fault detector means to said input circuit means to deliver an input signal thereto indicative of detection of a fault condition or the like upon such detection to operate said output circuit means for energization of the indicator to indicate such detection.

6. The circuit of claim 1, wherein said output circuit means comprises electrical terminals to which the indicator is electrically connected, transistor switch means for completing a circuit path to said terminals to energize the indicator, and impedance means for limiting the amplitude of a power surge to said transistor switch means upon short circuiting of said electrical terminals.

7. A monitor circuit for monitoring detection of a fault condition or the like to control energization of an indicator, comprising power supply means for supplying electric power to the monitor circuit, output circuit means for controlling energization of the indicator, timer circuit means for operating said output circuit means each time said power supply means powers up the monitor circuit to energize the indicator for a predetermined duration and thereafter while said power supply means continues to supply electric power to the monitor circuit to maintain the indicator de-energized, said timer circuit means including a resistor and a capacitor connected in series circuit, input circuit means for bypassing said timer circuit means upon receipt of an input signal indicative of detection of a fault condition or the like to operate said output circuit means for energization of the indicator to indicate such detection, said input circuit means including a discharge circuit coupled in parallel with said capacitor to discharge the same, said discharge circuit including a transistor, and said timer circuit means including delay means for delaying completion of such bypassing of said timer circuit means to preclude inadvertent energization of the indicator in response to electrical noise signals received by said input circuit means, said delay means including resistor means coupled in said discharge circuit in series relation with said transistor for delaying such discharging of said capacitor.

8. The circuit of claim 7, wherein said input circuit means further comprises a NAND gate for receiving respective input signals selectively to bias said transistor to conduction to effect bypassing of said capacitor by discharging the same through the emitter collector path of said transistor and said resistor means.

9. A monitor circuit for monitoring detection of a fault condition or the like to control energization of an indicator, comprising power supply means for supplying electric power to the monitor circuit, output circuit means for controlling energization of the indicator, said output circuit means including a comparator amplifier, a transistor switch coupled to said comparator amplifier and biased to conduction by said comparator amplifier when the input voltage to the latter exceeds a predetermined amplitude, and impedance means coupled in series circuit relation with respect to said transistor switch to limit electrical power surges thereto, timer circuit means for operating said output circuit means each time said power supply means powers up the monitor circuit to energize the indicator for a predetermined duration and thereafter while said power supply means continues to supply electric power to the monitor circuit to maintain the indicator de-energized, said timer circuit means including a resistor and a capacitor connected in series circuit, input circuit means for bypassing said timer circuit means upon receipt of an input signal indicative of detection of a fault condition or the like to operate said output circuit means for energization of the indicator to indicate such detection, said input circuit means including a discharge circuit coupled in parallel with said capacitor to discharge the same, and said timer circuit means including delay means for delaying completion of such bypassing of said timer circuit means to preclude inadvertent energization of the indicator in response to electrical noise signals received by said input circuit means, said delay means including resistor means coupled in said discharge circuit in series relation with said transistor for delaying such discharging of said capacitor.

10. The circuit of claim 9, wherein said input circuit means comprises discharge circuit means for discharging said capacitor means, and wherein said delay means comprises impedance means coupled in said discharge circuit means for increasing the time required to effect sufficient discharging of said capacitor means to operate said comparator to energize the indicator.

11. The circuit of claim 10, wherein said discharge circuit means comprises a transistor.

12. The circuit of claim 11, wherein said input circuit means further comprises a plural input NAND gate coupled to effect biasing of said transistor to conduction to discharge said capacitor means when such a fault condition is detected.

13. The circuit of claim 2, further comprising in combination therewith an anti-skid brake control system having a plurality of transducer means for producing respective AC transducer signals indicative of the rotational speed of respective wheels of a vehicle and a plurality of controllers for responding to respective AC transducer signals to produce respective dump signals upon detecting an incipient or actual skid, a locked wheel, or like condition, respective fault detection circuits in each of said controllers for detecting faults in the latter, and means for coupling said fault detectors in said NAND gate, whereby the indicator is energized upon detection of a fault in any one of said controllers.

14. A monitor circuit for monitoring detection of a fault condition or the like to control energization of an indicator, comprising power supply means for supplying electric power to the monitor circuit, output circuit means for controlling energization of the indicator, timer circuit means for operating said output circuit means each time said power supply means powers up the monitor circuit to energize the indicator for a predetermined duration and thereafter while said power supply means continues to supply electric power to the monitor circuit to maintain the indicator de-energized, input circuit means for bypassing said timer circuit means upon receipt of an input signal indicative of detection of a fault condition or the like to operate said output circuit means for energization of the indicator to indicate such detection, said timer circuit means including delay means for delaying completion of such bypassing of said timer circuit means to preclude inadvertent energization of the indicator in response to electrical noise signals received by said input circuit means, and said output circuit means including a comparator, and said timer circuit means including capacitor means for passing an electrical signal of sufficient magnitude to said comparator upon energization of the monitor circuit to effect operation of the latter to energize the indicator until said capacitor means charges to a predetermined voltage.

15. A monitor circuit for monitoring detection of a fault condition or the like to control energization of an indicator, comprising power supply means for supplying electric power to the monitor circuit, output circuit means for controlling energization of the indicator, said output circuit means including electrical terminals to which the indicator is electrically connected, transistor switch means for completing a circuit path to said terminals to energize the indicator, and impedance means for limiting the amplitude of a power surge to said transistor switch means upon short circuiting of said electrical terminals, said impedance means including a self-heating resistor having a resistance that increases with increasing temperature, timer circuit means for operating said output circuit means each time said power supply means powers up the monitor circuit to energize the indicator for a predetermined duration and thereafter while said power supply means continues to supply electric power to the monitor circuit to maintain the indicator de-energized, input circuit means for bypassing said timer circuit means upon receipt of an input signal indicative of detection of a fault condition or the like to operate said output circuit means for energization of the indicator to indicate such detection, and said timer circuit means including delay means for delaying completion of such bypassing of said timer circuit means to preclude inadvertent energization of the indicator in response to electrical noise signals received by said input circuit means.

* * * * *